US012562363B2

(12) United States Patent
Huh et al.

(10) Patent No.: US 12,562,363 B2
(45) Date of Patent: Feb. 24, 2026

(54) COORDINATE CORRECTION SYSTEM AND CORRECTION METHOD OF ROLL MAP IN ELECTRODE BREAKAGE

(71) Applicant: LG ENERGY SOLUTION, LTD., Seoul (KR)

(72) Inventors: Seung Huh, Daejeon (KR); Jong Seok Park, Daejeon (KR); Dong Yeop Lee, Daejeon (KR); Jun Hyo Su, Daejeon (KR); Ki Deok Han, Daejeon (KR); Byoung Eun Han, Daejeon (KR); Su Wan Park, Daejeon (KR); Gi Yeong Jeon, Daejeon (KR); Jae Hwan Lee, Daejeon (KR); Min Su Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/204,230

(22) Filed: May 9, 2025

(65) Prior Publication Data

US 2025/0266419 A1     Aug. 21, 2025

Related U.S. Application Data

(63) Continuation of application No. 17/944,801, filed on Sep. 14, 2022.

(30) Foreign Application Priority Data

Aug. 18, 2021     (KR) ........................ 10-2021-0109000

(51) Int. Cl.
H01M 4/04          (2006.01)
H01M 4/139         (2010.01)

(52) U.S. Cl.
CPC ....... *H01M 4/0404* (2013.01); *H01M 4/0409* (2013.01); *H01M 4/139* (2013.01)

(58) Field of Classification Search
None
See application file for complete search history.

(56) References Cited

U.S. PATENT DOCUMENTS

2019/0381589 A1     12/2019   Abe et al.
2023/0109490 A1*     4/2023   Park .......................... G01B 5/02
                                                                  29/593

FOREIGN PATENT DOCUMENTS

JP          2002156210 A      5/2002
JP          2008068434 A      3/2008
(Continued)

*Primary Examiner* — Walter L Lindsay, Jr.
*Assistant Examiner* — Geoffrey T Evans
(74) *Attorney, Agent, or Firm* — Bryan Cave Leighton Paisner LLP

(57)                ABSTRACT

A roll map coordinate correction system simulating an electrode moving in a roll-to-roll state between an unwinder and a rewinder includes a position expressed as a coordinate in a length direction of the simulated electrode, an encoder configured to derive the position of the electrode according to rotation amounts of the unwinder and the rewinder, and a seam detection sensor configured to detect a seam connection member and acquire a coordinate of the seam connection member in conjunction with the encoder. The system includes a reference point detector configured to detect a plurality of reference points marked on the electrode and acquire coordinates of the reference points in conjunction with the encoder, and a roll map coordinate corrector wherein, the roll map coordinate corrector determines a roll map correction direction by comparing encoder values, calculates an electrode breakage length by comparing coordinates and corrects the coordinates of the roll map.

15 Claims, 6 Drawing Sheets

(56)          References Cited

FOREIGN PATENT DOCUMENTS

| | | | |
|---|---|---|---|
| JP | 2013165026 | A | 8/2013 |
| JP | 6119188 | B2 | 4/2017 |
| JP | 6713278 | B2 | 6/2020 |
| JP | 6760997 | B2 | 9/2020 |
| KR | 1020130025958 | A | 3/2013 |
| KR | 1020160016186 | A | 2/2016 |
| KR | 102131335 | B1 | 7/2020 |
| KR | 1020210048327 | A | 5/2021 |
| KR | 1020210066757 | A | 6/2021 |

* cited by examiner

【FIG. 1】
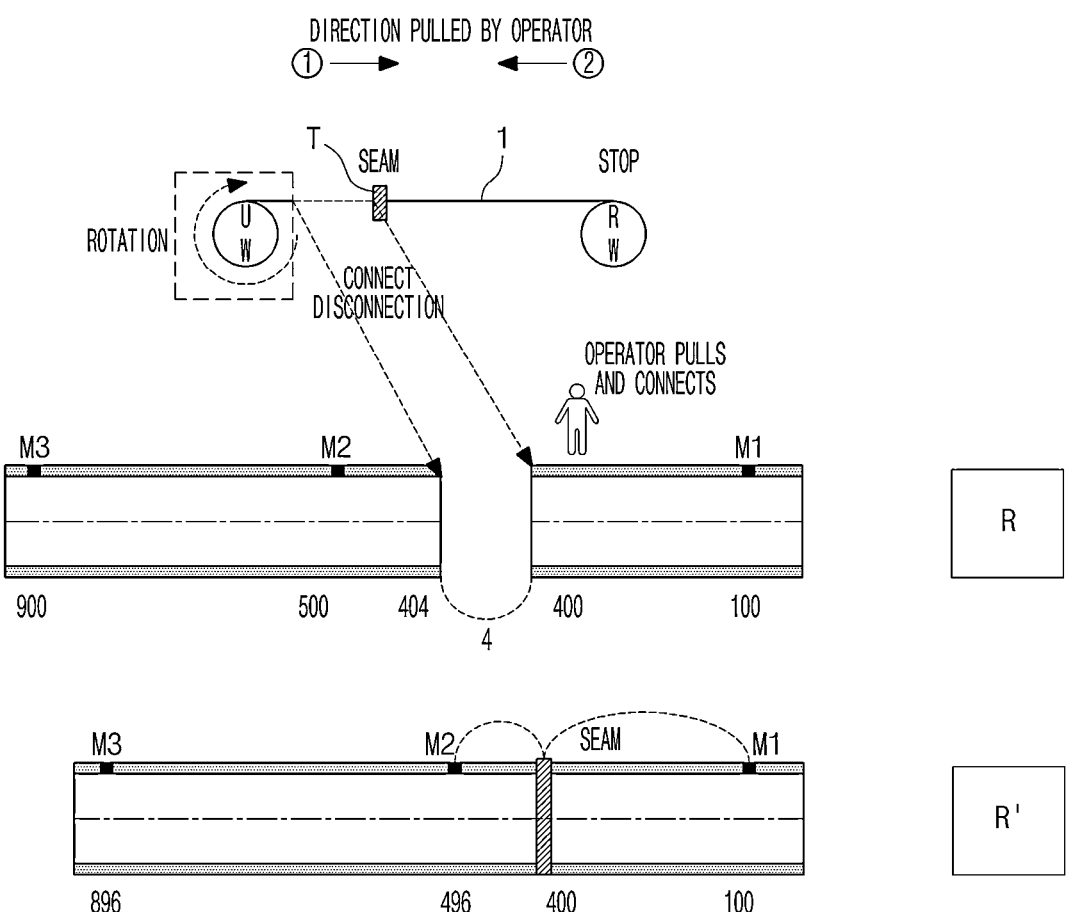
R: ROLL MAP OF PRECEDING PROCESS, R'   ROLL MAP OF CURRENT PROCESS 【FIG. 2】
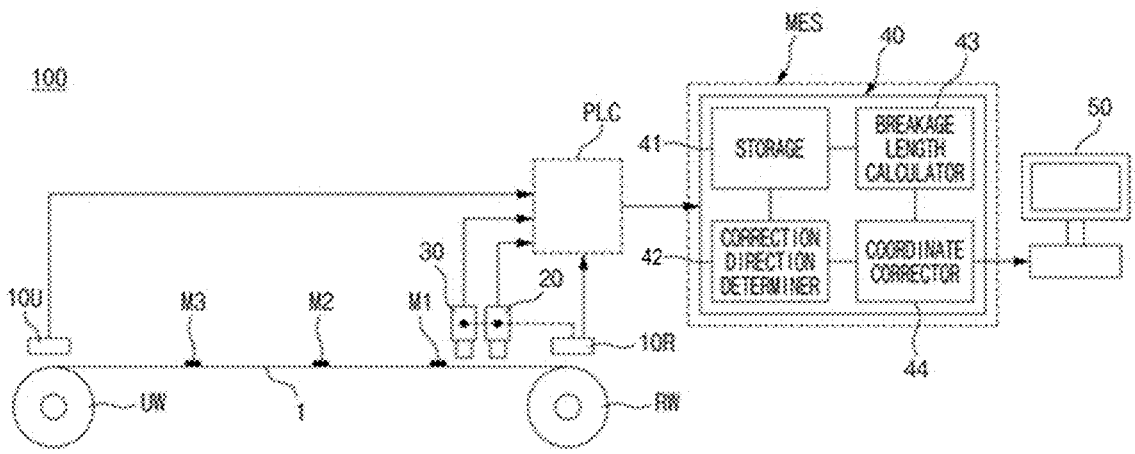

【FIG. 3】
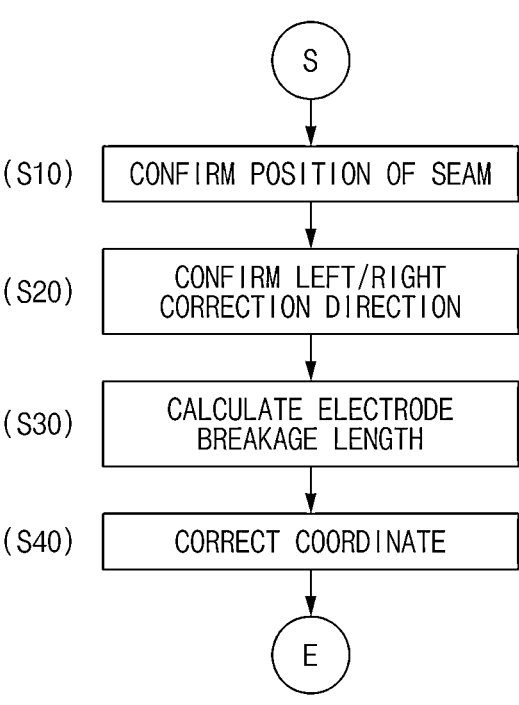

【FIG. 4】
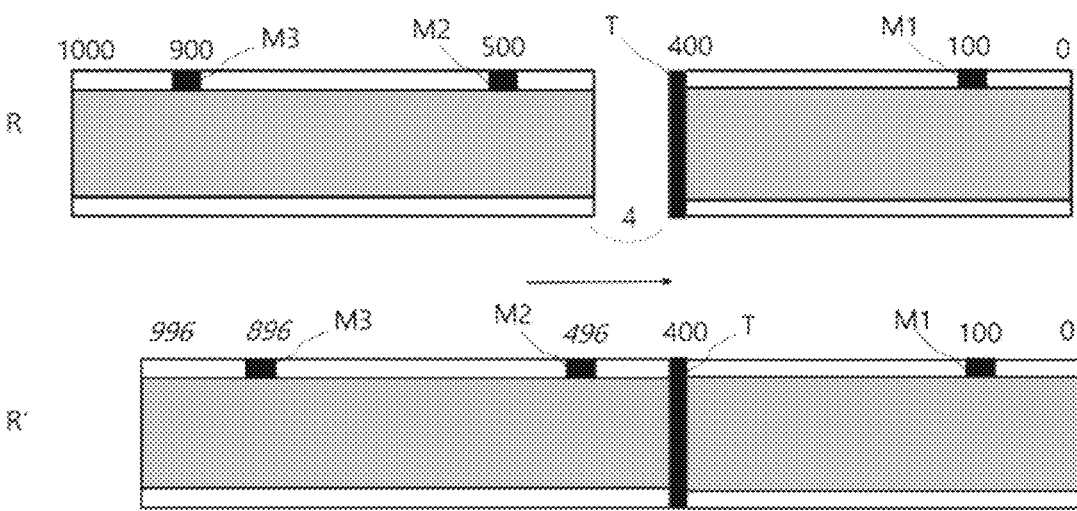

[FIG. 5]
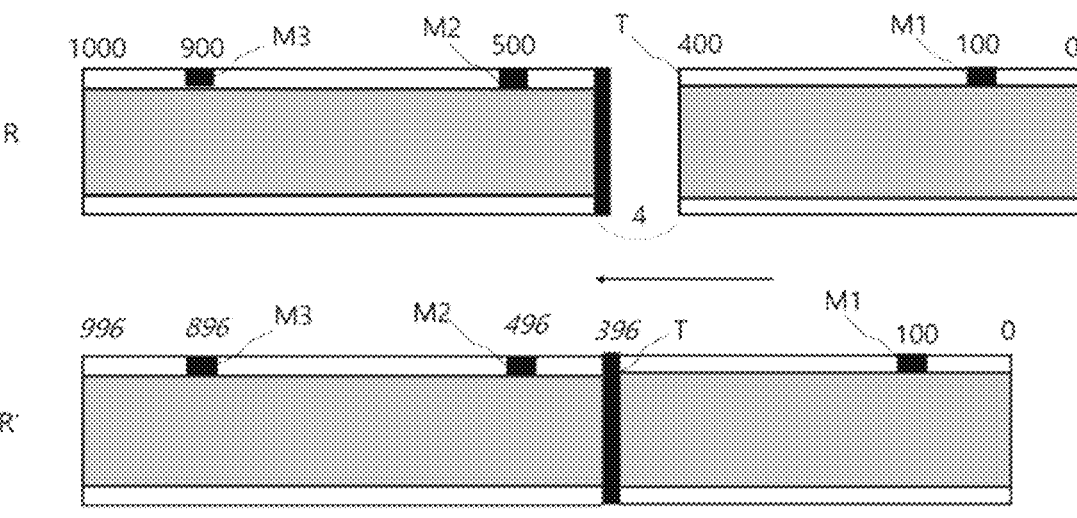

[FIG. 6]
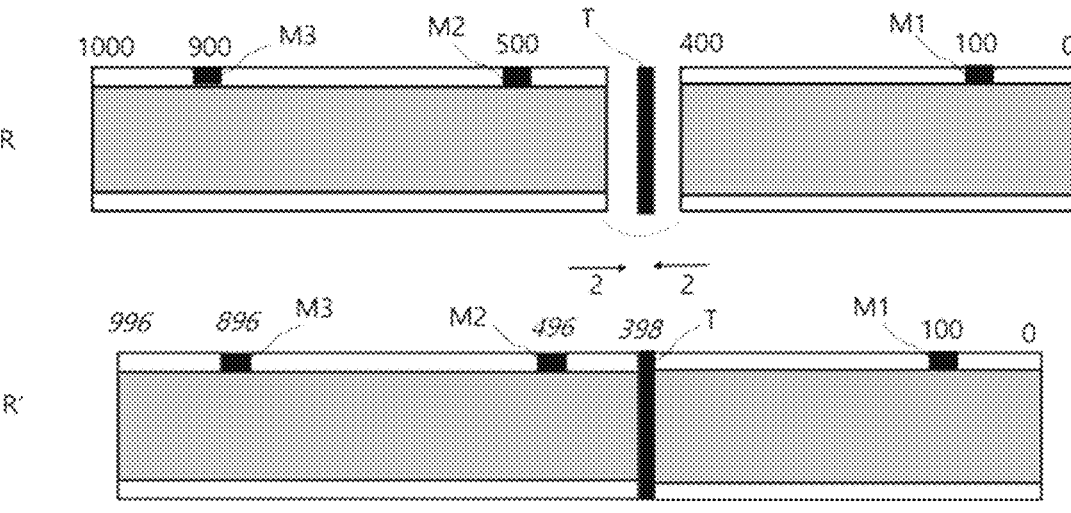

COORDINATE CORRECTION SYSTEM AND CORRECTION METHOD OF ROLL MAP IN ELECTRODE BREAKAGE

CROSS-REFERENCE TO RELATED APPLICATION

This application is a continuation of U.S. patent application Ser. No. 17/944,801, filed on Sep. 14, 2022, which claims priority to and the benefit of Korean Patent Application No. 10-2021-0109000, filed on Aug. 18, 2021, the disclosure of which is incorporated herein by reference in its entirety.

BACKGROUND

1. Field of the Invention

The present disclosure relates to a system and method for correcting coordinates of a roll map in which a movement of an electrode moving in a roll-to-roll state is simulated and pieces of data on various events in an electrode process are expressed.

More particularly, the present disclosure relates to a roll map coordinate correction system and correction method for securing data consistency of an actual electrode and a system by correcting coordinates of a roll map according to a direction in which an electrode is pulled when the electrode is broken and the broken electrodes are connected.

2. Discussion of Related Art

With the increase in technology development and demand for mobile devices, the demand for secondary batteries is also rapidly increasing. Among them, lithium secondary batteries are widely used as energy sources for various electronic products as well as various mobile devices because of their high energy density and operating voltage, and excellent storage and lifespan characteristics.

A so-called electrode process of manufacturing an electrode of a lithium secondary battery includes a coating process of forming a positive electrode and a negative electrode by applying an active material and a predetermined insulating material to a surface of a metal electrode plate which is a current collector, a roll press process of rolling the coated electrode, and a slitting process of cutting the rolled electrode according to dimensions.

In the electrode manufactured in the electrode process, an electrode tab is formed by a notching process, a separator is interposed between the positive electrode and the negative electrode to form an electrode assembly, and then a secondary battery is formed through an assembly process of stacking or folding the electrode assembly, packaging the electrode assembly in a pouch or can, and injecting an electrolyte into the pouch or can. Thereafter, the assembled secondary battery goes through an activation process of imparting battery characteristics through charging and discharging to become a secondary battery that is a final finished product.

In particular, a roll map is being used in which the movement of an electrode moving in a roll-to-roll state in the electrode process is simulated and the movement of the electrode is expressed in the form of a bar. In the roll map, data related to quality or defects may be expressed on the bar of the roll map shown on a screen by simulating the electrode in a roll-to-roll state, and thus a piece of data related to quality or defects in the electrode coating process can be easily grasped visually at a glance.

The roll map may be generated for each detailed process of the electrode coating process, the roll press process, and the slitting process. For example, information on a roll map generated in a first process may be utilized in a second process, and in the second process, defects may be removed with reference to the roll map of the first process. However, when an electrode is broken in the second process and a breakage portion is connected by a seam connection member such as a connection tape, a length of the electrode becomes shorter by as much as a length of the broken electrode. In this case, coordinates (dimensions in a length direction) of the roll map of the first process and dimensions of an actual electrode of the second process do not match each other. Accordingly, in a third process after the second process, the electrode whose length is shortened proceeds in a roll-to-roll state, and thus, the roll map of the first process cannot be referred to in the third process. As described above, when the coordinates of the roll map are not corrected when the electrode is broken, the coordinates of the roll map are different from the dimensions of the actual electrode, and thus data regarding quality or a defect position may not be accurately expressed, and also, there is a risk in that, when the roll map is referred to in a subsequent process, the subsequent process is performed using the wrong position coordinates.

As is apparent from the above description, when an electrode is broken, it is necessary to correct coordinates of a roll map in consideration of a breakage length or an amount of loss of the electrode so that the coordinates of the roll map match those of an actual electrode.

SUMMARY OF THE INVENTION

The present disclosure is directed to providing a roll map coordinate correction system and correction method in electrode breakage, capable of correcting coordinates of a roll map, in which the movement of an electrode moving in a roll-to-roll state is simulated and expressed in the form of a bar, in consideration of an electrode breakage length.

According to an aspect of the present disclosure, there is provided a roll map coordinate correction system that is a coordinate correction system of a roll map in which a movement of an electrode moving in a roll-to-roll state between an unwinder and a rewinder is simulated and expressed in a form of a bar, and a position of the electrode is expressed as a coordinate in a length direction of the bar, and includes an encoder configured to derive the position of the electrode according to rotation amounts of the unwinder and the rewinder as an encoder value, a seam detection sensor configured to detect a seam connection member attached to the electrode and acquire a coordinate of the seam connection member in conjunction with the encoder, a reference point detector configured to detect a plurality of reference points marked at a predetermined interval on the electrode and acquire coordinates of the reference points in conjunction with the encoder, and a roll map coordinate corrector connected to the encoder, the seam detection sensor, and the reference point detector and configured to acquire the encoder value, the coordinate of the seam connection member, and the coordinates of the reference points, wherein the roll map coordinate corrector determines a roll map correction direction by comparing the encoder values of the unwinder and the rewinder in the case of connecting the broken electrodes by the seam connection member, calculates an electrode breakage length by comparing the coordinates of the reference points before and after the coordinate of the seam connection member with coordinates of set reference points, and corrects the coordinates of the roll map by as much as the electrode breakage length according to the determined roll map correction direction.

As one example, the roll map coordinate corrector may include a correction direction determiner configured to determine the roll map correction direction by comparing the encoder values of the unwinder and the rewinder in the case of connecting the broken electrodes by the seam connection member, a breakage length calculator configured to calculate the electrode breakage length by comparing the coordinates of the reference points before and after the coordinate of the seam connection member with the coordinates of the set reference points, and a coordinate corrector configured to correct the coordinates of the roll map by as much as the electrode breakage length according to the determined roll map correction direction.

Further, the roll map coordinate corrector may further include a storage in which the encoder values, coordinate data of the seam connection member, coordinate data of the reference points, and roll map data of a preceding process are stored.

The roll map may be a roll map of a roll press process.

As one example, the roll map coordinate corrector may be a manufacturing execution system (MES) or a component of the MES.

According to another aspect of the present disclosure, there is provided a roll map coordinate correction method that is a coordinate correction method of a roll map in which a movement of an electrode moving in a roll-to-roll state between an unwinder and a rewinder is simulated and expressed in a form of a bar, and a position of the electrode is expressed as a coordinate in a length direction of the bar, and includes deriving a coordinate of a seam connection member of an electrode during roll-to-roll transfer from an encoder value of a rewinder, determining a roll map correction direction by comparing the encoder value of the rewinder with an encoder value of an unwinder in the case of connecting the broken electrodes by the seam connection member, calculating an electrode breakage length by comparing coordinates of reference points, which are marked on the electrode, before and after the seam connection member with coordinates of set reference points, and correcting the coordinates of the roll map by as much as the electrode breakage length according to the determined roll map correction direction.

Specifically, the correcting of the coordinate of the roll map may be performed after the entire electrode is wound around the rewinder and an electrode roll is completed.

As one example, the encoder values of the unwinder and the rewinder in the case of connecting the broken electrodes by the seam connection member may be encoder values of the unwinder and the rewinder when roll-to-roll transfer equipment is stopped and re-operated before the seam connection member is detected.

Specifically, the electrode breakage length may be calculated by comparing an interval of the reference points before and after the seam connection member and an interval of the set reference points.

As one example, when the encoder value of the unwinder in the case of connecting the broken electrodes by the seam connection member is greater than the encoder value of the rewinder, the coordinate of the roll map toward the unwinder from the seam connection member may be corrected.

In this case, the coordinate of the roll map after the seam connection member may be subtracted by as much as the electrode breakage length and corrected.

As another example, when the encoder value of the rewinder in the case of connecting the broken electrodes by the seam connection member is greater than the encoder value of the unwinder, the coordinate of the seam connection member may be corrected.

In this case, the coordinate of the seam connection member may be subtracted by the electrode breakage length and corrected, and the coordinate of the roll map after the seam connection member may also be subtracted by the electrode breakage length and corrected.

As still another example, when the encoder values of the unwinder and the rewinder in the case of connecting a seam are the same, the coordinate of the roll map of the seam connection member and the coordinate of the roll map toward the unwinder from the seam connection member may both be corrected.

In this case, the coordinate of the roll map of the seam connection member and the coordinate of the roll map toward the unwinder from the seam connection member may be subtracted by the same length and corrected.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which:

FIG. 1 is a schematic view illustrating a change of coordinates of a roll map when an electrode is broken and an operator pulls one side of the broken electrode to connect the broken electrodes;

FIG. 2 is a schematic view of a roll map coordinate correction system in electrode breakage according to one embodiment of the present disclosure;

FIG. 3 is a flowchart illustrating a roll map coordinate correction method in electrode breakage of the present disclosure;

FIG. 4 is a schematic view illustrating one embodiment of the roll map coordinate correction method of the present disclosure;

FIG. 5 is a schematic view illustrating another embodiment of the roll map coordinate correction method of the present disclosure; and FIG. 6 is a schematic view illustrating still another embodiment of the roll map coordinate correction method of the present disclosure.

DETAILED DESCRIPTION OF EXEMPLARY EMBODIMENTS

Hereinafter, the detailed configuration of the present disclosure will be described in detail with reference to the accompanying drawings and various embodiments. Embodiments described below are exemplary to assist in understanding the present disclosure, and in order to help understand the present disclosure, the accompanying drawings are not shown to scale and the dimensions of some components may be exaggerated.

As the present disclosure allows for various changes and numerous forms, particular embodiments will be illustrated in the drawings and described in detail in the text. However, this is not intended to limit the present disclosure to the specific forms disclosed, and it should be understood that the present disclosure encompasses all changes, equivalents, and substitutes within the spirit and scope of the present disclosure.

FIG. 1 is a schematic view illustrating a change of coordinates of a roll map when an electrode is broken and an operator pulls one side of the broken electrode to connect the broken electrodes.

Referring to FIG. 1, in an electrode process, an electrode 1 is unwound from an unwinder UW and proceeds in a roll-to-roll state while being wound around a rewinder RW. In this case, the electrode may be broken by internal and external factors such as defects, excessive tension, and the like of the electrode 1 itself. When the electrode 1 is broken, an operator may connect the broken electrodes by pulling one of the broken electrodes. A seam connection member T is used to connect the electrodes. A connection tape coated with an adhesive is commonly used as the seam connection member T. The breakage of the electrode as referred to in this specification includes a case in which the operator arbitrarily removes a defective part and connects the electrodes as well as the case in which the electrode is broken due to the internal and external factors. That is, since the process in which the electrode 1 is reduced in length as the electrode 1 is broken or partially removed and is connected by a connection tape is equally applied to a process in which the electrode is broken, and a process in which the electrode is arbitrarily removed by the operator, the electrode breakage in the case in which coordinates of a roll map are corrected includes the case in which the electrode is arbitrarily removed.

FIG. 1 illustrates roll maps R and R' in which the progress of an electrode in a roll-to-roll state is simulated.

The electrode 1 of FIG. 1, which is an object of the roll map, is an electrode having a total length of 1000 meters, and three reference points are marked on the electrode at 400-meter intervals. That is, reference points M1, M2, and M3 are marked at points of 100 meters, 500 meters, and 900 meters. Such reference points are also marked on the roll maps R and R' and used to calculate an electrode breakage length as will be described below. The number and interval of the reference points may vary depending on the length or specifications of the electrode.

The roll map R on an upper portion of FIG. 1 simulates a state in which the electrode is broken in a preceding process among detailed processes of the electrode process. That is, it shows that an electrode breakage of 4 meters occurs in the preceding process and the electrode 1 decreases in length by 4 meters, and thus, the length of the electrode is reduced to 996 meters. In this case, when the present process (current process) is carried out using the roll map R having a length (coordinates) of 1000 meters without correcting the roll map coordinate according to the electrode breakage, an error between the broken electrode and the actual electrode is generated, and thus, the roll map R of the preceding process cannot be utilized in the current process or subsequent processes of the preceding process.

The roll map R' in a lower portion of FIG. 1 is a roll map corrected by reflecting the electrode breakage. For example, a case in which the operator pulls the electrode at a 400-meter point from left to right and connects the disconnected portion by the seam connection member T is illustrated. Accordingly, the coordinates of the roll map on a left side of the 400-meter point are corrected by 4 meters, which is the breakage length.

The present disclosure provides a roll map coordinate correction system in electrode breakage for such roll map correction. In FIG. 1, the roll map is illustrated as reflecting the case in which the electrode 1 is connected by pulling the electrode 1 from the left, but the electrode may also be connected by pulling the electrode from the right. In this case, the roll map correction should be performed differently from that in FIG. 1. In addition, it is sometimes unclear whether the electrode is actually pulled from the left or the right and connected. This is presumed to be a case in which the electrode is repeatedly broken twice, both electrodes are pulled and connected, or the like. Thus, these various cases need to be considered when correcting the roll map.

FIG. 2 is a schematic view of a roll map coordinate correction system in electrode breakage according to one embodiment of the present disclosure.

A roll map coordinate correction system 100 of the present disclosure is the coordinate correction system 100 of a roll map in which the movement of an electrode 1 moving in a roll-to-roll state between an unwinder UW and a rewinder RW is simulated, the movement of the electrode 1 is expressed in the form of a bar, and a position of the electrode 1 is expressed as a coordinate in a length direction of the bar, and includes encoders 10U and 10R (collectively denoted by 10) configured to derive the position of the electrode 1 according to rotation amounts of the unwinder UW and the rewinder RW as an encoder value, a seam detection sensor 20 configured to detect a seam connection member T attached to the electrode 1 and acquire a coordinate of the seam connection member in conjunction with the encoders 10U and 10R (10), a reference point detector 30 configured to detect a plurality of reference points M1, M2, and M3 marked at a predetermined interval on the electrode 1 and acquire coordinates of the reference points in conjunction with the encoders 10U and 10R (10), and a roll map coordinate corrector 40 connected to the encoders, the seam detection sensor 20, and the reference point detector 30 and configured to acquire the encoder value, the coordinates of the seam connection member T, and the coordinates of the reference points. The roll map coordinate corrector 40 determines a roll map correction direction by comparing encoder values of the unwinder UW and the rewinder RW in the case of connecting the broken electrodes 1 by the seam connection member T, calculates an electrode breakage length by comparing the coordinates of the reference points before and after the coordinate of the seam connection member T with coordinates of set reference points, and corrects the coordinates of the roll map by as much as the electrode breakage length according to the determined roll map correction direction.

The roll map coordinate correction system 100 of the present disclosure includes the encoders, the seam detection sensor 20, the reference point detector 30, and the roll map coordinate corrector 40.

Each of the encoders may derive the position of the electrode 1 according to the rotation amounts of the unwinder UW and the rewinder RW as an encoder value. Specifically, the encoders are rotary encoders 10R and 10U that extract a position value of the electrode 1 from rotation amounts of motors that respectively drive the rewinder RW and the unwinder UW. The encoders are provided on both the unwinder side and the rewinder side. For example, the rotary encoders 10R and 10U may be installed in motor drivers of the rewinder RW and the unwinder UW, respectively. Since the electrode 1 is wound around the rewinder RW as much as the electrode 1 is unwound from the unwinder UW, the position values (encoder values) of the electrode 1 derived from the unwinder UW and the rewinder RW are the same. Since the encoders detect the position of the electrode 1 as well as the positions of the reference points M1, M2, and M3 and the seam connection member T, and the encoder values are a basis for determining the roll map correction direction, the encoders are essential members in the roll map coordinate correction system 100 of the present disclosure.

The seam detection sensor 20 detects the seam connection member T (e.g., a connection tape) that connects the broken electrodes when the electrode is broken and is attached to the electrode. When the seam detection sensor 20 detects the seam connection member T, it can be confirmed that breakage has occurred in the electrode. In addition, the seam detection sensor 20 may be connected to the encoders in a wired or wireless manner and may acquire an encoder value at the time of detecting the seam connection member T. Accordingly, the seam detection sensor 20 can acquire data related to a position coordinate of the seam connection member T. The presence of the seam connection member T means that the electrodes before and after the coordinate of the seam connection member T are pulled and connected. Thus, the positions (coordinates) of the reference points before and after the seam connection member T are also changed. Accordingly, in order to perform a roll map coordinate correction, the seam connection member T should already be present, and the acquisition of the coordinate of the seam connection member T should be preceded. The seam detection sensor 20 may be, for example, a color sensor. Since a color of the connection tape is different from that of a typical electrode, the connection tape, which is a part having a color different from that of the electrode, can be detected by the color sensor.

The reference point detector 30 may acquire position coordinate data of the reference points M1, M2, and M3 in conjunction with the encoders. That is, the reference point detector 30 may be connected to the encoders in a wired or wireless manner and may acquire encoder values at the time of detecting the reference points. Accordingly, the reference point detector 30 may acquire data related to position coordinates of the reference points M1, M2, and M3 marked on the electrode 1. The reference point detector 30 may be an optical character recognition (OCR) reader capable of reading printed characters by OCR. Alternatively, a vision camera capable of detecting the reference points M1, M2, and M3 by including a vision sensor may be employed as the reference point detector 30.

The roll map coordinate correction system 100 of the present disclosure includes the roll map coordinate corrector 40. As shown in FIG. 2, the roll map coordinate corrector 40 may be connected to the encoders, the seam detection sensor 20, and the reference point detector 30, and may acquire the encoder values, the coordinate of the seam connection member T, the coordinates of the reference points M1, M2, and M3.

Specifically, the roll map coordinate corrector 40 may compare the encoder values of the unwinder and the rewinder in the case of connecting the broken electrodes by the seam connection member T to determine a roll map correction direction, compare the coordinates of the reference points before and after the coordinate of the seam connection member T with coordinates of set reference points to calculate an electrode breakage length, and correct the coordinates of the roll map by as much as the electrode breakage length according to the determined roll map correction direction.

The roll map coordinate corrector 40 determines the roll map correction direction by comparing the encoder values of the unwinder and the rewinder in the case of connecting the broken electrodes by the seam connection member T. As described above, the relative position of the seam connection member T and the coordinates of the roll map are changed depending on which electrode of the electrodes about the seam connection member T is pulled and connected when the breakage occurs. To this end, as shown in FIG. 2, the roll map coordinate corrector 40 may be connected to the encoders 10U and 10R of the unwinder UW and the rewinder RW and may acquire the respective encoder values thereof. As described above, in principle, the encoder values of the unwinder UW and the rewinder RW are the same, but when the electrode 1 is broken, and one of the broken electrodes is pulled, the unwinder UW or the rewinder RW on a side of the pulled electrode is rotated, and thus the encoder values of the unwinder UW and the rewinder RW become different. Accordingly, when the encoder values of the unwinder UW and the rewinder RW are compared, it is possible to determine the electrode corresponding to the coordinate of the roll map to be corrected among the electrodes centered on the seam connection member T. In addition, the roll map coordinate corrector 40 calculates the electrode breakage length by comparing the coordinates of the reference points before and after the seam connection member T with coordinates of set reference points. When the correction direction is determined, a correction amount should be determined. At this point, the correction amount becomes the electrode breakage length. When the coordinates of the reference points changed due to the electrode breakage are compared with the coordinates of the set reference points (i.e, the coordinates of the reference points in the original roll map without change), the electrode breakage length can be grasped. To this end, the roll map coordinate corrector 40 is connected to the reference point detector 30, and acquires the position coordinate data of the reference points M1, M2, and M3 and calculates the electrode breakage length.

When the roll map correction direction and the correction amount (electrode breakage length) are determined, the roll map coordinate corrector 40 corrects the coordinates of the roll map accordingly. A detailed process of correcting the coordinates of the roll map will be described in more detail in relation to a roll map coordinate correction method to be described below.

The roll map coordinate corrector 40 may be directly connected to the encoders, the seam detection sensor 20, and the reference point detector 30, or may be connected to the encoders and the like through a controller (a programmable logic controller (PLC) controller) that controls the transfer of the electrode 1, as shown in FIG. 2. In this case, the PLC controller may process the data acquired by the encoders, the seam detection sensor 20, and the reference point detector 30 into a data format that can be edited or corrected by the roll map coordinate corrector 40.

Specifically, the roll map coordinate corrector 40 includes a correction direction determiner 42 configured to determine the roll map correction direction by comparing the encoder values of the unwinder UW and the rewinder RW in the case of connecting the broken electrodes by the seam connection member T, a breakage length calculator 43 configured to calculate the electrode breakage length by comparing the coordinates of the reference points, which are marked on the electrode, before and after the seam connection member T with the coordinates of the set reference points, and a coordinate corrector 44 configured to correct the coordinates of the roll map by as much as the electrode breakage length according to the determined roll map correction direction. The correction direction determiner 42, the breakage length calculator 43, and the coordinate corrector 44 may be computing devices that can communicate with each other.

Further, the roll map coordinate corrector 40 may further include a storage 41 in which the encoder values, the position coordinate data of the seam connection member T, the position coordinate data of the reference points, and roll map data of a preceding process are stored.

The correction direction determiner 42 determines the roll map correction direction by comparing the encoder values of the unwinder UW and the rewinder RW stored in the storage 41. In addition, the breakage length calculator 43 calculates the breakage length by comparing the coordinates of the reference points stored in the storage 41 and the coordinates of the set reference points. The coordinate corrector 44 receives data from the correction direction determiner 42 and the breakage length calculator 43 to calculate and correct the coordinates of the roll map. In this case, the coordinate corrector 44 may correct the coordinates of the roll map of the current process by comparing the roll map data, breakage length, and the like of the preceding process.

The corrected roll map may be visualized and displayed on a screen. To this end, the roll map coordinate corrector 40 or the coordinate corrector 44 may be connected to the display 50 (see FIG. 2).

The roll map may be a roll map of a roll press process. For example, breakage frequently occurs before and after pressing is performed by a roll press. Accordingly, in the roll press process, a roll map of an electrode coating process, which is a preceding process, is referenced to correct the coordinates of the roll map due to the breakage, and thus the roll map of the roll press process can be generated.

The roll map coordinate corrector 40 may be a manufacturing execution system (MES) of a factory or a component of the MES.

FIG. 3 is a flowchart illustrating a roll map coordinate correction method in electrode breakage according to the present disclosure.

The roll map coordinate correction method of the present disclosure includes deriving a position coordinate of a seam connection member T of an electrode during roll-to-roll transfer from an encoder value of a rewinder RW (S10), determining a roll map correction direction by comparing the encoder value of the rewinder RW with an encoder value of an unwinder UW in the case of connecting the broken electrodes by the seam connection member T (S20), calculating an electrode breakage length by comparing coordinates of reference points, which are marked on the electrode, before and after the seam connection member T with coordinates of set reference points (S30), and correcting coordinates of a roll map by as much as the electrode breakage length according to the determined roll map correction direction (S40).

The correcting of the coordinates of the roll map may be performed after the entire electrode is wound around the rewinder RW and an electrode roll is completed. That is, when the electrode proceeds in a roll-to-roll manner from the unwinder UW to the rewinder RW, the roll map coordinate correction in the MES cannot be performed since all of the data such as the encoder value has not yet been acquired. When the electrode is wound around the rewinder RW and the electrode in the form of a jelly roll is completed, finally, the correction work begins.

First, coordinates are detected by the seam detection sensor 20, and when coordinates of a roll map of a preceding process and the coordinates of the reference points recognized in the current process are different from each other, the correction starts (see FIG. 1). In addition, whether there is a data history of roll-to-roll transfer equipment being stopped and re-operated before the seam connection member T is recognized is also referenced. As the encoders installed in the unwinder UW and the rewinder RW, there are an encoder that stops operation when the roll-to-roll transfer equipment is stopped and an encoder that operates even when the equipment is stopped. In the roll map correction of the present disclosure, values of both the two types of encoders can be utilized.

Accordingly, the encoder values of the unwinder UW and the rewinder RW can be acquired even when the broken electrodes are connected by the seam connection member T, and these encoder values are encoder values of the unwinder UW and rewinder RW when the roll-to-roll transfer equipment is stopped and re-operated before the seam connection member T is detected.

As a first operation of the correction, a position coordinate of the seam connection member T of the electrode during roll-to-roll transfer is derived from the encoder value of the rewinder RW (S10). In the correction method of the present disclosure, it is assumed that only a connection tape is used as the seam connection member T when the electrode is broken in the transfer equipment. The connection tape has a length of about 30 cm and is small in size, and thus, the connection tape is negligible compared to the electrode breakage length. For example, a case in which the broken electrodes are connected by a poly (ethylene terephthalate) (PET) film longer than the connection tape was not considered.

When the coordinate of the seam connection member T is confirmed, the encoder values of the unwinder UW and the rewinder RW are compared. The encoder values at this time are encoder values when a seam is present and the broken electrodes are connected. In terms of equipment, the encoder values are encoder values of the rewinder RW and the unwinder UW when the equipment is stopped and re-operated. At this time, when any one of the encoder values of the unwinder UW and the rewinder RW is changed, it means that an operator pulled at least one side of the electrode and connected the broken electrodes by the seam connection member T, and thus, the roll map correction direction can be determined by comparing the encoder values (S20).

When the roll map correction direction is determined, the electrode breakage length is calculated by comparing the coordinates of the reference points before and after the seam connection member T with the coordinates of the set reference points (coordinates expressed in the roll map of the preceding process). When the electrode is broken, an interval of the reference points is changed by the breakage length of the electrode. Accordingly, the coordinates of the set reference points are different from the coordinates of the reference points after the electrodes are connected by the seam connection member T, and the interval between the reference points is also different from the interval between the reference points of the roll map of the preceding process. Accordingly, the breakage length of the electrode can be calculated (S30).

When the roll map correction direction and the breakage length (correction amount) are determined, the coordinates of the roll map are corrected by the breakage length according to the determined roll map correction direction (S40).

A detailed correction process will be described in detail with reference to the following embodiments.

First Embodiment

FIG. 4 is a schematic view illustrating one embodiment of the roll map coordinate correction method of the present disclosure.

This case is a case in which, when an electrode is broken, the broken electrodes are connected by pulling the electrode on an unwinder UW side.

The original length of the electrode is 1000 meters, and in a roll map R of the preceding process, reference points are marked at 400-meter intervals in three places of 100 meters, 500 meters, and 900 meters. It is assumed that the electrode is broken and the electrode of 4 meters is lost.

First, a position coordinate of a seam connection member T detected by a seam detection sensor 20 during roll-to-roll transfer is derived from an encoder value of a rewinder RW. The encoder value of the rewinder RW at the time of detecting the seam connection member T was 400 meters.

In this case, the encoder value of the rewinder RW is compared with an encoder value of the unwinder UW in the case of connecting the broken electrodes by the seam connection member T. When the encoder value of the unwinder UW is greater than the encoder value of the rewinder RW, it means that the broken electrodes are connected by pulling the electrode on the unwinder UW side. Accordingly, when the encoder value of the unwinder UW in the case of connecting the broken electrodes by the seam connection member T is greater than the encoder value of the rewinder RW, the coordinate of the roll map toward the unwinder UW from the seam connection member T is corrected. That is, a correction direction is the coordinate of the roll map toward the unwinder UW from the seam connection member T.

Since the correction direction is determined, an electrode breakage length is calculated. A coordinate of a second reference point M2 detected in the equipment by the reference point detector 30 is 496 meters and thus has a difference of 4 meters with 500 meters, which is the coordinate of the reference point set before the breakage occurs. Thus, the breakage length is determined to be 4 meters. Alternatively, the breakage length may also be calculated from a change value between the intervals (100 meters and 496 meters) of the coordinates of the detected reference points M1 and M2 and the intervals (100 meters and 500 meters) of the coordinates of the set reference points.

Since the correction direction and the breakage length are calculated, the coordinate of the roll map toward the unwinder UW from the seam connection member T is subtracted by as much as the electrode breakage length and corrected. That is, when the coordinate of the seam connection member T is 400 meters, the roll map coordinate correction is completed by correcting 500 meters, which is the coordinate of the second reference point M2, to 496 meters, correcting 900 meters, which is the coordinate of a third reference point M3, is to 896 meters, and correcting 1000 meters, which is a coordinate of an electrode finishing end portion, to 996 meters. In a lower portion of FIG. 4, a corrected roll map R' of the current process is illustrated. From the roll map R', it can be seen that the interval between the seam connection member T and the second reference point M2 is reduced from 100 meters to 96 meters. On the other hand, the interval between the seam connection member T and the first reference point M1 is 300 meters and is not changed.

The coordinates in which the breakage length is not reflected may be referred to as absolute coordinates, and the coordinates in which the breakage length is reflected may be referred to as relative coordinates. As described above, according to the present disclosure, by correcting the relative coordinates of the roll map through a series of correction operations, a state that matches a state of an actual electrode can be obtained.

Second Embodiment

FIG. 5 is a schematic view illustrating another embodiment of the roll map coordinate correction method of the present disclosure.

First, a position coordinate of a seam connection member T detected by a seam detection sensor 20 during roll-to-roll transfer is derived from an encoder value of a rewinder RW. The encoder value of the rewinder RW at the time of detecting the seam connection member T was 400 meters the same as in the first embodiment.

In this case, the encoder value of the rewinder RW is compared with an encoder value of an unwinder UW in the case of connecting broken electrodes by the seam connection member T. When the encoder value of the rewinder RW in the case of connecting the broken electrodes by the seam connection member T is greater than the encoder value of the unwinder UW, the coordinate of the seam connection member T is corrected. That is, a correction direction is toward the rewinder RW from the seam connection member T.

Since the correction direction is determined, an electrode breakage length is calculated. A coordinate of a second reference point M2 detected in the equipment by the reference point detector 30 is 496 meters and thus has a difference of 4 meters with 500 meters, which is the coordinate of the reference point set before the breakage occurs. Thus, the breakage length is determined to be 4 meters.

Since the correction direction and the breakage length are calculated, a coordinate of a roll map R toward the rewinder RW from the seam connection member T is subtracted by as much as the electrode breakage length and corrected. However, in this case, since a length of the electrode from an electrode starting end portion to a first reference point M1 is not changed, only the coordinate of the seam connection member T is subtracted and corrected. In addition, coordinates of the roll map after the seam connection member T should also be sequentially subtracted by as much as the electrode breakage length, in the same manner in which the coordinate of the seam connection member T is subtracted and corrected. That is, in this case, the coordinate is not corrected according to the correction direction, but since the coordinate of the seam connection member T is corrected, it may be said that the numerical value changes accordingly.

Reflecting this, when the coordinate of the seam connection member T is 400 meters, the coordinate corrector 44 subtracts the breakage electrode length of 4 meters therefrom and corrects the coordinate of the seam connection member T to 396 meters. Accordingly, the coordinate of the second reference point M2 is also corrected from 500 meters to 496 meters, a coordinate of a third reference point M3 is also corrected from 900 meters to 896 meters, and a coordinate of an electrode finishing end portion is also corrected from 1000 meters to 996 meters, thereby completing the correction. In a lower portion of FIG. 5, a corrected roll map R' of the current process is illustrated. From the roll map R', it can be seen that an interval between the seam connection member T and the first reference point M1 is reduced from 300 meters to 296 meters. On the other hand, an interval between the seam connection member T and the second reference point M2 is 100 meters and is not changed.

Third Embodiment

FIG. 6 is a schematic view illustrating still another embodiment of the roll map coordinate correction method of the present disclosure.

First, a position coordinate of a seam connection member T detected by a seam detection sensor 20 during roll-to-roll transfer is derived from an encoder value of a rewinder RW. The encoder value of the rewinder RW at the time of detecting the seam connection member T was 400 meters the same as in the first and second embodiments.

In this case, the encoder value of the rewinder RW is compared with an encoder value of an unwinder UW in the case of connecting broken electrodes by the seam connection member T. When the encoder value of the rewinder RW in the case of connecting the broken electrodes by the seam connection member T is the same as the encoder value of the unwinder UW, this may mean a case in which the electrode is broken, and the electrode on the rewinder RW side is pulled once and the electrode on the unwinder UW side is pulled once and the electrode is connected, or a case in which both broken electrodes are pulled and connected when the electrode is broken. In this case, coordinates of both sides centered on a breakage point are all corrected. That is, the coordinate of the roll map R of the seam connection member T and the coordinate of the roll map toward the unwinder UW from the seam connection member T are both corrected.

When the correction direction is determined, an electrode breakage length is calculated. A coordinate of a second reference point M2 detected in the equipment by the reference point detector 30 is 496 meters and thus has a difference of 4 meters with 500 meters, which is the coordinate of the reference point set before the breakage occurs. Thus, the breakage length is determined to be 4 meters.

Since the correction direction and the breakage length are calculated, the coordinate of the roll map of the seam connection member T and the coordinate of the roll map toward the unwinder UW from the seam connection member T are each subtracted by as much as the same length.

When the coordinate of the roll map toward the unwinder UW from the seam connection member T is subtracted by 2 meters, the coordinate of the second reference point M2 is corrected from 500 meters to 498 meters, a coordinate of a third reference point M3 is corrected from 900 meters to 898 meters, and a coordinate of an electrode finishing end portion is corrected from 1000 meters to 998 meters.

Further, when the coordinate of the seam connection member T is subtracted by 2 meters, 400 meters become 398 meters.

As described above, the coordinates of the roll map after the seam connection member T should also be sequentially subtracted by as much as the electrode breakage length, in the same manner in which the coordinate of the seam connection member T is subtracted and corrected. Thus, when the coordinate of the roll map toward the unwinder UW from the seam connection member T is subtracted again by 2 meters, the coordinate of the second reference point M2 is corrected from 498 meters to 496 meters, the coordinate of the third reference point M3 is corrected from 898 meters to 896 meters, and the coordinate of the electrode finishing end portion is corrected from 998 meters to 996 meters, thereby completing the correction. In a lower portion of FIG. 6, a corrected roll map R' of the current process is illustrated. From the roll map R', it can be seen that an interval between the seam connection member T and the first reference point M1 is reduced by 2 meters from 300 meters to 298 meters. In addition, it can be seen that an interval between the seam connection member T and the second reference point M2 is also reduced by 2 meters from 100 meters to 98 meters.

However, in the case of the present embodiment, it is assumed that the encoder values of the unwinder UW and the rewinder RW are not changed and the correction is performed by pulling both broken electrodes by the same length with respect to a breakage portion, and thus, the accuracy of the correction may be somewhat degraded as compared to the first and second embodiments.

According to the present disclosure, in addition to the simple electrode breakage length, information on which electrode of the electrodes on the unwinder side and the rewinder side is pulled to connect the broken electrodes can be grasped. In addition, since each coordinate of the roll map is corrected to match the state of the actual electrode, the corrected roll map can be used not only in the current process but also in subsequent processes.

In an electrode process according to the present disclosure, even when a roll map and dimensions of a preceding process are changed due to breakage and connection of an electrode, coordinates of the roll map can be corrected by reflecting a length of the broken electrode. Accordingly, consistency between roll map data of a system and a real electrode can be improved, so that the corrected roll map can be used in a subsequent process.

Further, the correction of the roll map can be referenced and can be used to track an electrode breakage length, dimensional defects, and the like.

In the above, the present disclosure has been described in more detail through the drawings and embodiments. However, the embodiments described in the specification and the configurations described in the drawings are only the most preferred embodiments of the present disclosure, and do not represent all of the technical ideas of the present disclosure. It is to be understood that there may be various equivalents and variations in place of them at the time of filing the present application.

What is claimed is:

1. A roll map coordinate correction system during electrode breakage, wherein a movement of an electrode moving in a roll-to-roll state between an unwinder and a rewinder is simulated and displayed as a roll map in a form of a bar, and a position of the electrode is indicated by coordinates in a longitudinal direction of the bar, comprising:

an encoder that derives the position of the electrode as an encoder value based on a rotation amount of the unwinder and rewinder;

a joint detection sensor that detects a joint connecting member attached to the electrode and acquires coordinates of the joint connecting member in conjunction with the encoder;

a reference point detector that detects a plurality of reference points marked at predetermined spacings on the electrode and acquires coordinates of the reference points in conjunction with the encoder; and a roll map coordinate correction part connected to the encoder, joint detection sensor, and reference point detector, which acquires encoder values, the coordinates of the joint connecting member, and the reference point coordinates, wherein the roll map coordinate correction part determines a roll map correction direction by comparing the encoder values of the unwinder and rewinder when broken electrodes are connected by the joint connecting member, and calculates an electrode breakage length by comparing the reference point coordinates before and after the joint connecting member coordinates with set reference point coordinates, and corrects roll map coordinates by the determined electrode breakage length according to the determined roll map correction direction.

2. The roll map coordinate correction system during electrode breakage of claim 1, wherein the roll map coordinate correction part comprises:

a correction direction determination part for determining the roll map correction direction by comparing the encoder values of the unwinder and rewinder when the broken electrodes are connected by the joint connecting member;

a breakage length calculation unit that calculates the electrode breakage length by comparing the reference point coordinates before and after the joint connecting member coordinates with the set reference point coordinates; and a coordinate correction part that corrects the coordinates of the roll map by the electrode breakage length according to the determined roll map correction direction.

3. The roll map coordinate correction system during electrode breakage of claim 1, wherein the roll map coordinate correction part further comprises:

a storing part storing the encoder values, the coordinate data of the joint connecting member, the coordinate data of the reference points, and roll map data of previous process.

4. The roll map coordinate correction system during electrode breakage of claim 1, wherein the roll map is a roll map of a roll press process.

5. The roll map coordinate correction system during electrode breakage of claim 1, wherein the roll map coordinate correction part is a production management system (MES) or a component of the production management system.

6. A roll map coordinate correction method during electrode breakage, wherein the movement of an electrode moving in a roll-to-roll state between an unwinder and a rewinder is simulated and displayed as a roll map in a form of a bar, and a position of the electrode is indicated by coordinates in a longitudinal direction of the bar, comprising:

deriving coordinates of a joint connecting member of the electrode during roll-to-roll transfer from encoder values of the rewinder;

determining a roll map correction direction by comparing encoder values of the unwinder and rewinder when connecting broken electrodes by the joint connecting member;

calculating an electrode breakage length by comparing coordinates of reference points marked on the electrodes before and after the joint connecting member with coordinates of set reference points; and correcting coordinates of the roll map by the electrode breakage length according to the determined roll map correction direction.

7. The roll map coordinate correction method during electrode breakage of claim 6, wherein the correction of the roll map coordinates is performed after all electrodes have been wound in the rewinder and an electrode roll has been completed.

8. The roll map coordinate correction method during electrode breakage of claim 6, wherein the encoder values of the unwinder and rewinder when the broken electrodes are connected by the joint connecting member are encoder values of the unwinder and rewinder when a roll-to-roll transfer equipment is stopped and restarted before the joint connecting member is detected.

9. The roll map coordinate correction method during electrode breakage of claim 6, wherein the electrode breakage length is calculated by comparing a distance between the reference points before and after the joint connecting member with a set reference point distance.

10. The roll map coordinate correction method during electrode breakage of claim 6, wherein when an encoder value of the unwinder is greater than an encoder value of the rewinder during broken electrode connection by the joint connecting member, the roll map coordinate is corrected from the joint connecting member toward the unwinder.

11. The roll map coordinate correction method during electrode breakage of claim 10, wherein a roll map coordinate after the joint connecting member is corrected by subtracting the electrode breakage length.

12. The roll map coordinate correction method during electrode breakage of claim 6, wherein when an encoder value of the rewinder is greater than an encoder value of the unwinder during broken electrode connection by the joint connecting member, the coordinate of the joint connecting member is corrected.

13. The roll map coordinate correction method during electrode breakage of claim 12, wherein the coordinate of the joint connecting member is corrected by subtracting the electrode breakage length, and accordingly, the roll map coordinate after the joint connecting member is also corrected by subtracting the electrode breakage length.

14. The roll map coordinate correction method during electrode breakage of claim 6, wherein when the encoder values of the unwinder and rewinder are the same during broken electrode connection by the joint connecting member, both a roll map coordinate of the joint connecting member and a roll map coordinate from the joint connecting member toward the unwinder are corrected.

15. The roll map coordinate correction method during electrode breakage of claim 14, wherein the roll map coordinate of the joint connecting member and the roll map coordinate from the joint connecting member toward the unwinder are corrected by subtracting a same length.

* * * * *